(12) United States Patent
Wesseling et al.

(10) Patent No.: US 9,494,850 B2
(45) Date of Patent: Nov. 15, 2016

(54) PROJECTION SYSTEM WITH A PLURALITY OF LIGHT-EMITTING ELEMENTS

(71) Applicant: OSRAM GmbH, Munich (DE)

(72) Inventors: Clemens Wesseling, Potsdam (DE); Henning Rehn, Berlin (DE)

(73) Assignee: OSRAM GMBH, Munich (DE)

( * ) Notice: Subject to any disclaimer, the term of this patent is extended or adjusted under 35 U.S.C. 154(b) by 99 days.

(21) Appl. No.: 14/366,268

(22) PCT Filed: Nov. 21, 2012

(86) PCT No.: PCT/EP2012/073187
§ 371 (c)(1),
(2) Date: Jun. 18, 2014

(87) PCT Pub. No.: WO2013/092078
PCT Pub. Date: Jun. 27, 2013

(65) Prior Publication Data
US 2014/0327887 A1    Nov. 6, 2014

(30) Foreign Application Priority Data

Dec. 20, 2011   (DE) .................... 10 2011 089 209 U

(51) Int. Cl.
*G03B 21/20*    (2006.01)
*H04N 9/31*    (2006.01)
(Continued)

(52) U.S. Cl.
CPC .......... *G03B 21/208* (2013.01); *G03B 21/147* (2013.01); *G03B 21/2033* (2013.01); *G03B 33/06* (2013.01);
(Continued)

(58) Field of Classification Search
CPC ................ G03B 21/2013; G03B 21/20; G03B 21/2033; G03B 21/208; G02B 27/09;
(Continued)

(56) References Cited

U.S. PATENT DOCUMENTS 5,162,844 A    11/1992 Ueda
5,634,704 A    6/1997 Shikama et al.
(Continued)

FOREIGN PATENT DOCUMENTS

CN    1417636 A    5/2003
CN    1628266 A    6/2005
(Continued)

OTHER PUBLICATIONS

Gressierer, Bernhard, EP1,403,695 A1; Mar. 31, 2004; Machine translation into English.*
(Continued)

*Primary Examiner* — William C Dowling
*Assistant Examiner* — Ryan Howard
(74) *Attorney, Agent, or Firm* — Viering, Jentschura & Partner mbB

(57) ABSTRACT

A projection system for illuminating a projection surface may include at least one light source formed from a plurality of light-emitting elements and an optical integrator having an entrance opening and an exit opening, into the entrance opening of which the light of each light-emitting element is coupled such that the mixed light of all the light-emitting elements emerges from its exit opening, and an imaging optical unit, which projects the light emerging from the exit opening of each integrator onto the projection surface, wherein an optical element is in each case arranged between the exit opening of each integrator and the imaging optical unit, said optical element shifting the virtual image of the entrance opening along an optical axis of the projection
(Continued)

system such that its image generated by the imaging optical unit is not visible on the projection surface.

19 Claims, 5 Drawing Sheets

(51) Int. Cl.
*G03B 33/06* (2006.01)
*G03B 21/14* (2006.01)
*G02B 27/09* (2006.01)

(52) U.S. Cl.
CPC ........... *G02B 27/09* (2013.01); *G03B 21/2013* (2013.01); *H04N 9/3164* (2013.01)

(58) Field of Classification Search
CPC ................ H04N 9/3138; H04N 9/3164; F21Y 2101/02
USPC ........... 353/94; 313/500; 362/555, 241, 302, 362/301, 311.02, 800
See application file for complete search history.

(56) References Cited

U.S. PATENT DOCUMENTS

| | | | |
|---|---|---|---|
| 5,829,858 A | 11/1998 | Levis et al. | |
| 6,227,669 B1 | 5/2001 | Tiao et al. | |
| 2003/0090632 A1 | 5/2003 | Kim et al. | |
| 2004/0062044 A1 | 4/2004 | Hamano | |
| 2004/0201829 A1 | 10/2004 | Eckhardt | |
| 2007/0091271 A1 | 4/2007 | Hamano | |
| 2010/0188018 A1* | 7/2010 | Salm | F21V 7/00 315/294 |
| 2010/0271598 A1 | 10/2010 | Murayama et al. | |
| 2011/0228231 A1 | 9/2011 | Schreiber et al. | |

FOREIGN PATENT DOCUMENTS

| | | |
|---|---|---|
| DE | 60309400 T2 | 2/2007 |
| DE | 102009024894 A1 | 12/2010 |
| EP | 1403695 A1 | 3/2004 |
| EP | 1482358 A1 | 12/2004 |
| EP | 2211090 A1 | 7/2010 |
| JP | 2007047707 A | 2/2007 |
| JP | 2007298898 A | 11/2007 |
| WO | 9701727 A1 | 1/1997 |
| WO | 2008027692 A2 | 3/2008 |

OTHER PUBLICATIONS

Search Report issued in the corresponding German application No. 102011089209.5, dated Feb. 7, 2014.
English abstract of EP 1403695 A1 of Mar. 31, 2004.
English abstract of JP 2007047707 A of Feb. 22, 2007.
International Search Report issued in the corresponding PCT application No. PCT/EP2012/073187, dated Feb. 21, 2013.
Chinese Office Action based on Application No. 201280058801.2(7 Pages and 5 Pages of English translation) dated May 5, 2015 (Reference Purpose Only).

* cited by examiner

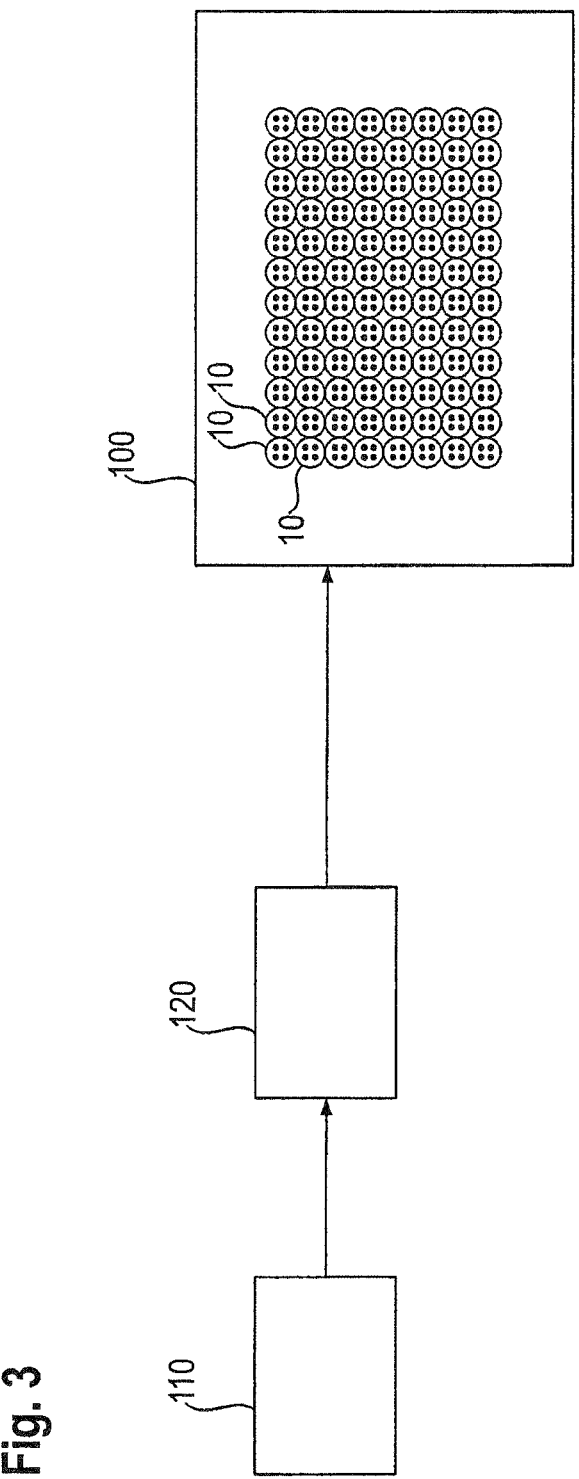

PROJECTION SYSTEM WITH A PLURALITY OF LIGHT-EMITTING ELEMENTS

RELATED APPLICATIONS

The present application is a national stage entry according to 35 U.S.C. §371 of PCT application No.: PCT/EP2012/073187 filed on Nov. 21, 2012, which claims priority from German application No.: 10 2011 089 209.5 filed on Dec. 20, 2011, and is incorporated herein by reference in its entirety.

TECHNICAL FIELD

Various embodiments relate to a projection system.

BACKGROUND

DE 603 09 400 T2 describes a projection system provided with a plurality of light-emitting elements such as LEDs, for example, downstream of which is arranged in each case an optical integrator, said projection system allowing a projection surface to be illuminated uniformly.

WO 2008/027692 A2 and WO 97/01727 A1 likewise describe the coupling-out of light from a light-emitting element by means of an optical integrator.

The document EP 2211090 A1 discloses a projection system for illuminating a projection surface. The projection system according to EP 2211090 A1 includes light sources, each consisting of a plurality of light-emitting elements. The light elements each emit light having a different wavelength. Light of each light-emitting element is coupled into an entrance opening of an optical integrator of the projection system such that mixed and collimated light of all the light-emitting elements emerges at its exit opening. An imaging optical unit projects the light emerging from the exit opening of each integrator onto the projection surface.

On account of the geometrical conditions and the general laws of optics, this gives rise not only to an imaging of the exit opening of the integrator, but also to an imaging of the entrance opening visible through the integrator, where the light of the light-emitting elements has not yet been mixed. The superimposition of the two imagings on the projection surface impairs the perceived imaging quality.

This is intended to be improved by means of a diffuser provided in EP 2211090 A1. However, the diffuser has the disadvantage of impairing the light efficiency.

SUMMARY

Various embodiments provide a projection system of the type mentioned above in which the imaging quality can be improved without having to accept the disadvantage mentioned above.

In the case of the present disclosure, the optical element generates virtual images of the entrance opening and of the exit opening of the integrator, the distance between which is greater than the length of the optical integrator. During the imaging of the virtual image of the exit opening onto the projection surface, now the virtual image of the entrance opening of the integrator is imaged into a plane that is far away from the projection surface, as a result of which its disturbing influence on the imaging of the exit surface becomes negligibly small.

As a result, it is possible to dispense with the use of diffusion elements that impair the illumination efficiency.

Furthermore, the efficiency of the projection system is further ensured by the fact that an integrator is used for each light source for the purpose of coupling out the light from the light-emitting elements. The optical integrator carries out an additive color mixing. Consequently, light having a specific wavelength need only be generated if it is required. A spectral filtering and the accompanying loss of efficiency during the generation of colored images are superfluous.

Preferably, each light source contains at least three light-emitting elements of different colors (RGB), which are selectively drivable, such that the mixed and collimated light emerging from the exit opening of the integrator has a color which can be chosen selectively. In this regard, besides white light, all mixed colors permitted by the light-emitting elements used can also be generated.

Preferably, the imaging optical unit is formed by at least one Fresnel lens. It is thus possible to obtain an imaging optical unit having a long focal length of 0.5 m to 1 m, for example, a large aperture ratio of 0.7 to 1.2, for example, and a small mass. As a result of the arrangement of a plurality of Fresnel lenses along the optical axis, image aberrations can furthermore be reduced.

Preferably, the projection system contains a multiplicity of selectively drivable light sources arranged in a matrix-like fashion with in each case an assigned convex lens, such that a corresponding pixel image can be imaged on the projection surface. In this regard, given suitable driving with low outlay, images and films having sufficient resolution can be displayed for example on a building wall as projection surface.

In this case, the diameter of the imaging optical unit is preferably greater than the largest extent of the area occupied by the light sources arranged in a matrix-like fashion. Losses owing to vignetting can be avoided as a result.

Further advantageous configurations can be found in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 3 shows a development of the projection system in accordance with the embodiment.

DETAILED DESCRIPTION

The following detailed description refers to the accompanying drawing that show, by way of illustration, specific details and embodiments in which the disclosure may be practiced.

Figure 1A:
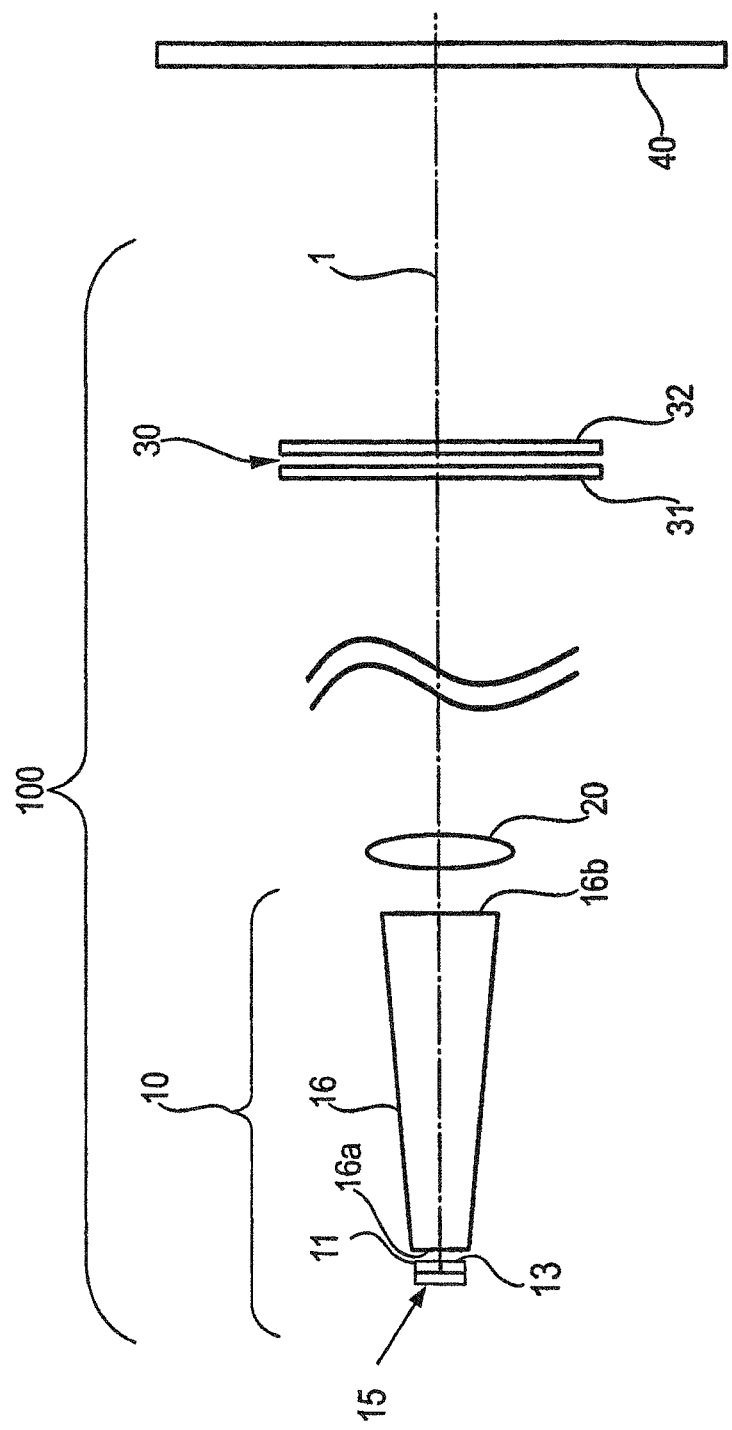
FIG. 1A shows a schematic view of an embodiment of the projection system according to the present disclosure.

FIG. 1A illustrates a projection system 100 in accordance with the preferred embodiment of the present disclosure. The projection system 100 includes along a common optical axis 1 a light source 10, a convex lens 20 as optical element, and an imaging optical unit 30 in this order. The imaging optical unit 30 is formed by two Fresnel lenses 31 and 32.

Figure 1B:
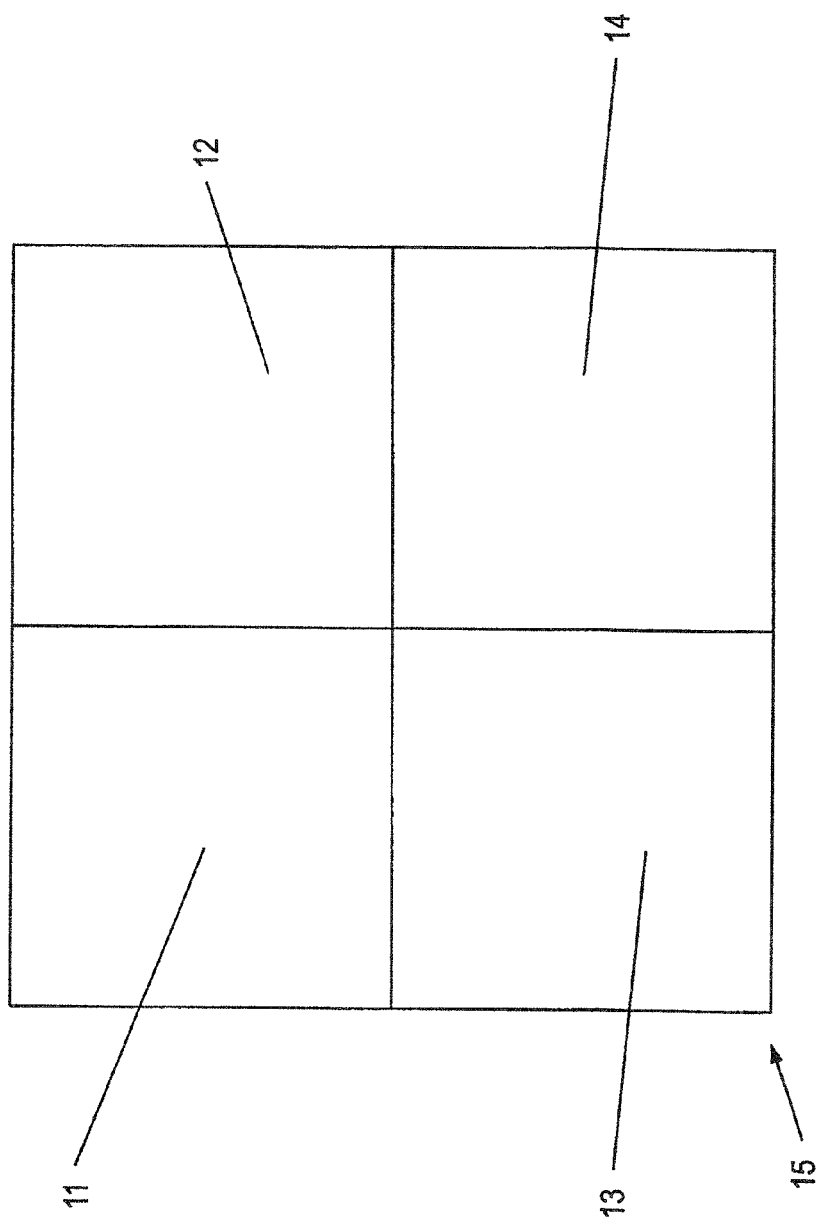
FIG. 1B shows a schematic plan view of an RGB multi-chip LED in accordance with the embodiment.

The light source 10 includes an RGB multi-chip LED 15 as a light unit and a conical light guiding rod 16 as an optical integrator. The RGB multi-chip LED 15, which is illustrated in plan view in FIG. 1B, includes as light-emitting elements four LED elements 11, 12, 13 and 14 arranged on a common plane. The LED elements 11 and 13 provide green light, the LED element 12 provides blue light, and the LED element 13 provides red light. Consequently, the RGB multi-chip LED 15 generates light having different spectral components. The RGB multi-chip LED 15 is arranged on the optical axis 1 directly upstream of an entrance opening 16a of the light guiding rod 16, such that a large part of the light emitted by the RGB multi-chip LED 15 is incident on an entrance opening 16a of the light guiding rod 16. A highest possible efficiency is obtained as a result. In the light guiding rod 16, light of different wavelengths is additively mixed and output through an exit opening 16b.

Disposed downstream of the light guiding rod 16 on the optical axis there is an optical element 20, which is embodied as a convex lens in the present embodiment. The exit opening 16b of the light guiding rod 16 is imaged by the imaging optical unit 30 onto a projection surface 40 at a relatively large distance. In the case of the present embodiment, said distance can be between two meters and twelve meters, for example.

Figure 2A:
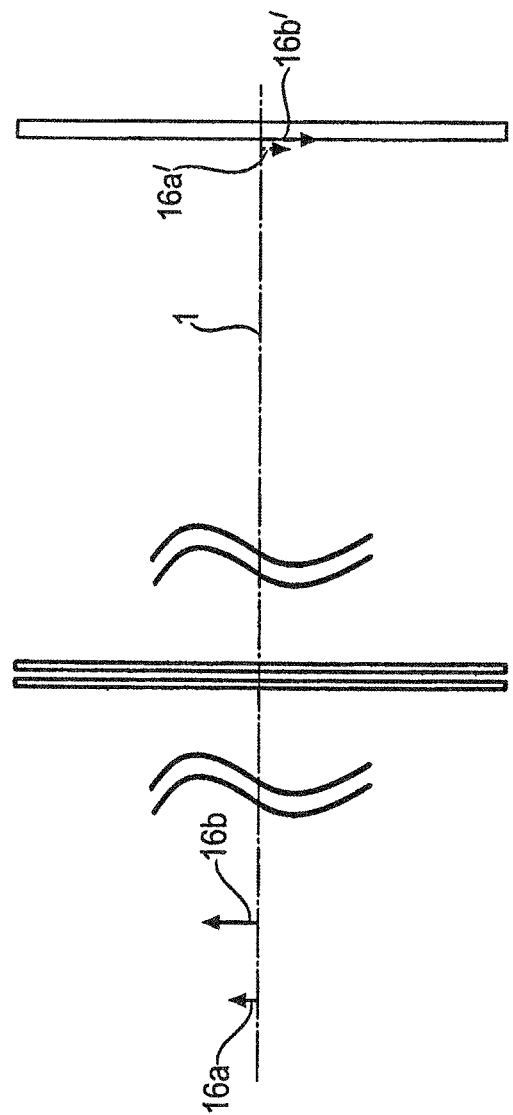
FIG. 2A shows a schematic view of a beam path of a projection system in accordance with a first comparative example.

The manner of operation of the convex lens 20 is explained below. In this respect, FIG. 2A illustrates a schematic view of a beam path of a projection system in accordance with a first comparative example. The comparative example does not have the convex lens 20. In FIG. 2A it is evident that, in the comparative example without a convex lens 20, both the entrance opening 16a and the exit opening 16b are imaged on the projection surface 40 as virtual entrance opening 16a' and as virtual exit opening 16b', respectively. If the virtual entrance opening 16a' and the virtual exit opening 16b' are jointly imaged sharply on the projection surface 40, these images are superimposed. If the light guiding rod 16 has a circular cross section, for example, the resulting image on the projection surface 40 is a disk with a smaller brighter disk in the center thereof. A pixel having a higher light intensity in the center than at the edge is thus generated.

Figure 2B:
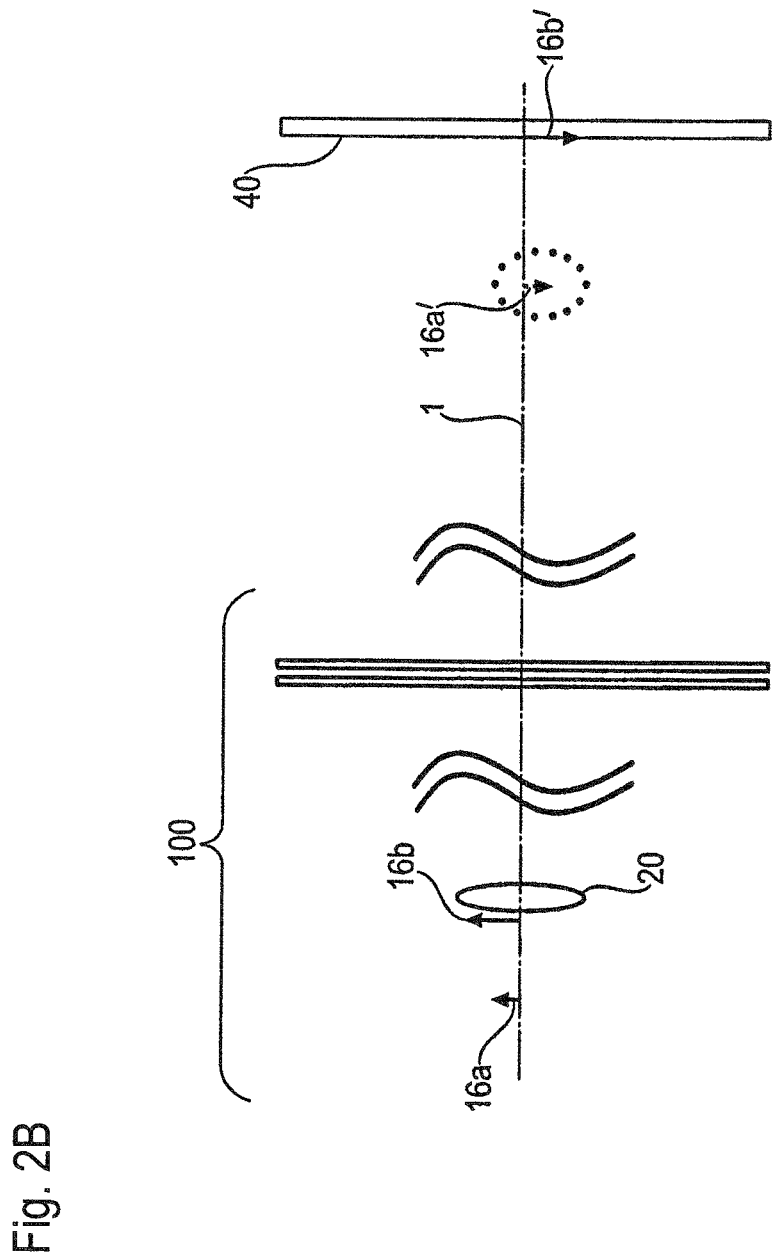
FIG. 2B shows a schematic view of a beam path of the projection system in accordance with the embodiment.

FIG. 2B shows a schematic view of a beam path of the present embodiment. As a result of the convex lens 20 arranged directly downstream of the exit opening 16b of the light guiding rod 16, the virtual entrance opening 16a' and the virtual exit opening 16b' are imaged at a distance from one another, such that a simultaneous sharp imaging does not take place. Consequently, an approximately homogeneously illuminated pixel is imaged on the projection surface 40.

A development of the above embodiment is illustrated in FIG. 3. In the present development, the projection system 100 includes a plurality of the light sources 10 and a number of convex lenses 20 corresponding to the number of the plurality of light sources 10. The light sources 10 are arranged together with their correspondingly assigned convex lenses 20 in a matrix structure. In FIG. 3, the matrix structure is formed by eight rows arranged one below another and each having twelve times the combination of the light source 10 and the convex lens 20. In this case, the light sources 10 and their correspondingly assigned convex lenses 20 are each arranged in a plane perpendicular to the optical axis.

The imaging optical unit 30 (not illustrated in FIG. 3) including the Fresnel lenses 31 and 32 is positioned with respect to the combination of the light sources 10 and convex lenses 20 such that the imaging thereof is at the desired distance in a plane. Specifically, the exit openings 16b of the integrators 16, which are arranged in accordance with a matrix in a common plane, are imaged by the imaging optical unit 30, which has a large diameter relative to the light sources 10 and the convex lenses 20, onto the projection surface 40 at the desired distance with the desired imaging scale.

FIG. 3 furthermore illustrates a storage device 110 and an image processing device 120. The storage device stores image data or video data that are intended to be projected onto the projection surface 40 by the projection system 100. The image data or video data can be data of the MPEG type, for example. A corresponding MPEG file can have, for example, a resolution of twelve times eight corresponding to the arrangement of the matrix structure.

The storage device 110 outputs the image data or video data to the image processing device 120. The image processing device 120 converts the data provided into drive signals for the light sources 10 and light-emitting elements 11 to 14 and outputs them to the projection system 100.

Each light source 10 constitutes a pixel. By means of suitable selective driving of the individual light sources 10, therefore, corresponding pixels are generated on the projection surface 40. The color of the individual pixels is determined by suitable drive signals for the corresponding light-emitting elements 11 to 14.

The projection surface 40 is a building wall in FIG. 3. The development of the projection system 100 as illustrated in FIG. 3 projects onto the building wall 40 an image or video—stored in the storage device 110—with a resolution corresponding to the number of light sources 10.

The exit openings 16b arranged in accordance with a matrix can cover a considerable area. In the case of square exit openings 16b having an edge length of 20 mm and eight rows each having twelve light guiding rods 16, this results in an area of 240 mm by 180 mm. In order to be able to suitably image this area, an imaging optical unit 30 having a long focal length and a large aperture is required. The focal length can be 400 mm or 500 mm, for example. In order to achieve a desired high illuminance on the projection surface 40 despite the good collimation by the light guiding rods 16, the imaging optical unit can have a larger edge length compared with the edge length of the matrix.

In the above embodiment, the light unit 15 is formed by an RGB multi-chip LED (R=red, G=green, B=blue) having four LEDs. The light unit can also be formed by an RGBW multi-chip LED (W=white). Furthermore, the light unit can be formed by any light-emitting elements which are arranged in spatial proximity such as on a plane, for example. Combinations of monochromatic or white LED elements as light unit 15 are conceivable. The radiation emission can also comprise radiation in the ultraviolet and/or infrared spectral range. Furthermore, combinations of other light-emitting elements such as laser diodes, lasers, incandescent lamps, discharge lamps are likewise conceivable. Furthermore, laser-activated remote phosphor (LARP) arrangements can be used as light-emitting elements, in which a phosphor layer spatially separated from the radiation source is excited by the emitted radiation from a laser diode and caused to emit fluorescent radiation. Moreover, organic LEDs (OLEDs) can also be used as light-emitting elements. What is essential is that the light-emitting elements are oriented such that they radiate into the entrance opening of the optical integrator.

A conical light guiding rod 16 is provided above as optical integrator. Alternatively, the integrator can also be formed by suitable mirrors. What is essential is that the optical integrator is configured such that the light which is incident in the entrance opening and which originates from different-colored light-emitting elements is mixed and collimated.

In the above explanations, the imaging optical unit 30 is formed by the two Fresnel lenses 31 and 32. However, the imaging optical unit 30 can also be formed by suitable other lenses or optical components. What is essential here is that these can ensure a desired high illuminance of the projection system 100 and an imaging at a desired large distance.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A projection system for illuminating a projection surface, comprising:
   at least one light source formed from a plurality of light-emitting elements and at least one optical integrator, each optical integrator having an entrance opening and an exit opening, into the entrance opening of which the light of each light-emitting element is coupled such that the mixed light of all the light-emitting elements emerges from its exit opening, and
   an imaging optical unit, which projects the light emerging from the exit opening of each integrator onto the projection surface,
   wherein an optical element is in each case arranged between the exit opening of each integrator and the imaging optical unit, said optical element shifting the virtual image of the entrance opening along an optical axis of the projection system such that its image generated by the imaging optical unit is not visible on the projection surface,
   wherein the light-emitting elements are designed for emitting electromagnetic radiation having different spectra.

2. The projection system as claimed in claim 1, wherein the optical element is arranged in direct proximity to the exit opening of each integrator.

3. The projection system as claimed in claim 1, wherein the optical element is a convex lens.

4. The projection system as claimed in claim 3, wherein the convex lens shifts the virtual image of the entrance opening such that it lies in front of the projection surface.

5. The projection system as claimed in claim 1, wherein each integrator is formed from a conical light guiding rod.

6. The projection system as claimed in claim 1, wherein each integrator is formed by mirrors.

7. The projection system as claimed in claim 1, wherein each of said at least one light source contains at least three light-emitting elements of different colors, which are selectively drivable, such that the mixed and collimated light emerging from the exit opening of the integrator has a color which can be chosen selectively.

8. The projection system as claimed in claim 1, wherein the imaging optical unit is formed by at least one Fresnel lens.

9. The projection system as claimed in claim 3, wherein said at least one light source of the projection system comprises a multiplicity of light sources arranged in a matrix-like fashion with in each case an assigned convex lens, such that a corresponding pixel image can be imaged on the projection surface.

10. The projection system as claimed in claim 9, wherein the diameter of the imaging optical unit is greater than the largest extent of the area occupied by the light sources arranged in a matrix-like fashion.

11. The projection system of claim 9 wherein each of said multiplicity of light sources is selectively drivable.

12. A projection system for illuminating a projection surface, comprising:
    at least one light source formed from a plurality of light-emitting elements and at least one optical integrator, each optical integrator having an entrance opening and an exit opening, into the entrance opening of which the light of each light-emitting element is coupled such that the mixed light of all the light-emitting elements emerges from its exit opening, and
    an imaging optical unit, which projects the light emerging from the exit opening of each integrator onto the projection surface,
    wherein an optical element is in each case arranged between the exit opening of each integrator and the imaging optical unit, said optical element shifting the virtual image of the entrance opening along an optical axis of the projection system such that its image generated by the imaging optical unit is not visible on the projection surface,
    wherein each integrator is formed from a conical light guiding rod.

13. The projection system as claimed in claim 12, wherein the light-emitting elements are designed for emitting electromagnetic radiation having different spectra.

14. The projection system as claimed in claim 12, wherein the optical element is arranged in direct proximity to the exit opening of each integrator.

15. A projection system for illuminating a projection surface, comprising:
    at least one light source formed from a plurality of light-emitting elements and at least one optical integrator, each optical integrator having an entrance opening and an exit opening, into the entrance opening of which the light of each light-emitting element is coupled such that the mixed light of all the light-emitting elements emerges from its exit opening, and
    an imaging optical unit, which projects the light emerging from the exit opening of each integrator onto the projection surface,
    wherein an optical element is in each case arranged between the exit opening of each integrator and the imaging optical unit, said optical element shifting the virtual image of the entrance opening along an optical axis of the projection system such that its image generated by the imaging optical unit is not visible on the projection surface, wherein each integrator is formed by mirrors.

16. The projection system as claimed in claim 15, wherein the light-emitting elements are designed for emitting electromagnetic radiation having different spectra.

17. The projection system as claimed in claim 15, wherein the optical element is arranged in direct proximity to the exit opening of each integrator.

18. The projection system as claimed in claim 15, wherein the optical element is a convex lens.

19. The projection system as claimed in claim 18, wherein said at least one light source of the projection system comprises a multiplicity of light sources arranged in a matrix-like fashion with in each case an assigned convex lens, such that a corresponding pixel image can be imaged on the projection surface.

\* \* \* \* \*